(12) United States Patent
van Walraven

(10) Patent No.: US 7,490,388 B2
(45) Date of Patent: Feb. 17, 2009

(54) PIPE CLAMP WITH SPRING NUT

(75) Inventor: Jan van Walraven, Mijdrecht (NL)

(73) Assignee: J. Van Walraven Holding B.V., Mijdrecht (NL)

( * ) Notice: Subject to any disclaimer, the term of this patent is extended or adjusted under 35 U.S.C. 154(b) by 0 days.

(21) Appl. No.: 11/783,427

(22) Filed: Apr. 9, 2007

(65) Prior Publication Data

US 2008/0019794 A1  Jan. 24, 2008

(30) Foreign Application Priority Data

Apr. 10, 2006  (NL) .................................. 1031555

(51) Int. Cl.
*F16L 33/04* (2006.01)

(52) U.S. Cl. ....................................................... 24/285

(58) Field of Classification Search ........... 24/279–286, 24/20 LS; 411/522, 523, 525–529, 174, 175, 411/112
See application file for complete search history.

(56) References Cited

U.S. PATENT DOCUMENTS

| | | | | |
|---|---|---|---|---|
| 2,345,053 A | * | 3/1944 | Judd et al. ................... | 411/523 |
| 2,359,418 A | * | 10/1944 | Hartman ....................... | 24/275 |
| 2,423,627 A | * | 7/1947 | Tinnerman ................... | 439/100 |
| 3,361,403 A | * | 1/1968 | Oeler et al. ................ | 248/205.1 |
| 3,648,335 A | * | 3/1972 | Henning ....................... | 24/279 |
| 5,256,018 A | * | 10/1993 | Rattmann et al. ........... | 411/175 |
| 6,196,506 B1 | | 3/2001 | Wakai | |
| 2005/0036851 A1 | * | 2/2005 | Dang et al. ................. | 411/175 |

FOREIGN PATENT DOCUMENTS

| | | |
|---|---|---|
| DE | 297 13 940 U1 | 9/1998 |
| EP | 908 637 A2 | 4/1999 |
| EP | 1 022 502 A | 7/2000 |
| WO | 98/00645 A | 1/1998 |
| WO | 99/08006 A | 2/1999 |

OTHER PUBLICATIONS

European Search Report dated Jul. 3, 2007.
PCT Report Concerning Novelty Search of International Type (English translation) dated Feb. 8, 2007.

* cited by examiner

*Primary Examiner*—James R Brittain
(74) *Attorney, Agent, or Firm*—Browdy and Neimark, P.L.L.C.

(57) ABSTRACT

A pipe clamp for attaching a duct to a base surface. The pipe clamp has a clamp body with an aperture for arranging the pipe clamp around the duct, a tightening element for keeping the ends of the clamp together, and a spring nut arranged on the second end of the clamp body and provided with a set of resilient lips with free ends facing one another, engaging the tightening element. The spring nut has a baseplate with a through-opening for the shank, and a set of connecting arms. The resilient lips are situated at a distance from the baseplate and are respectively connected to an associated connecting arm which extends substantially transversely to the resilient lip.

9 Claims, 4 Drawing Sheets

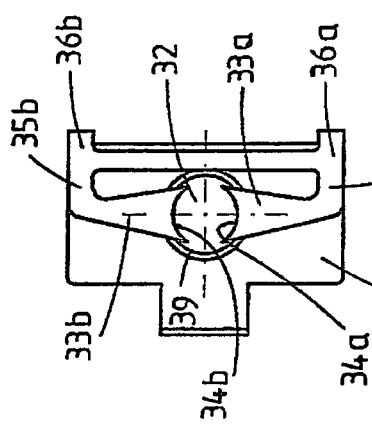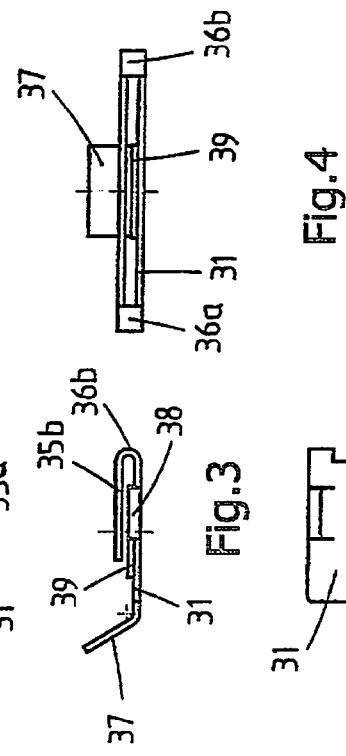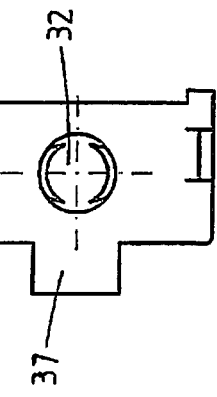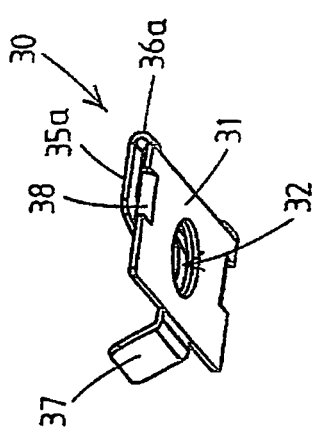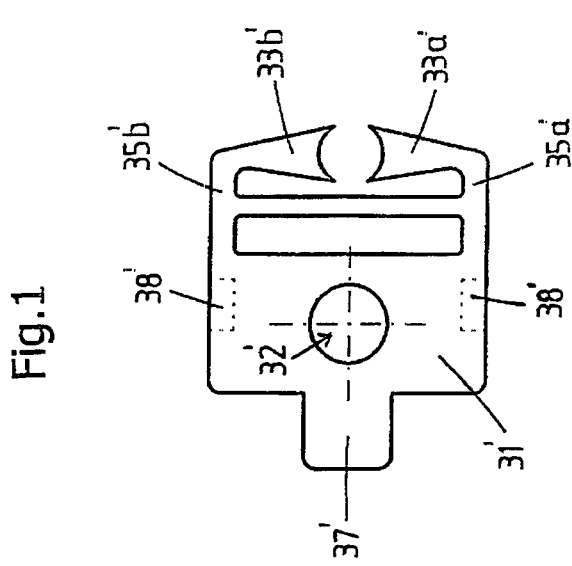

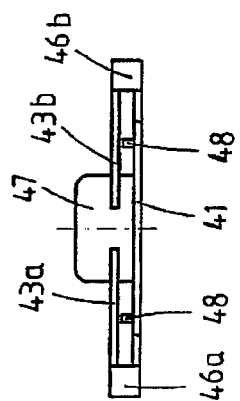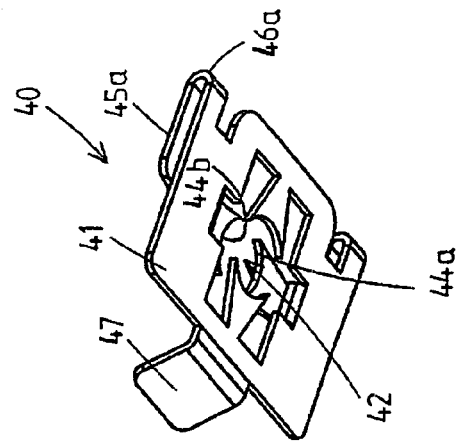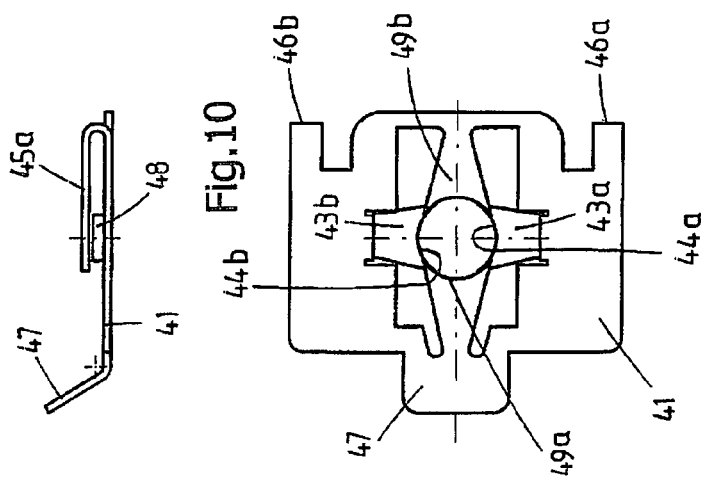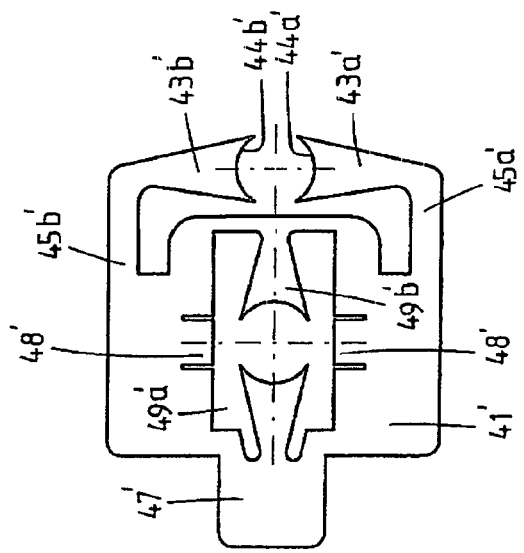

PIPE CLAMP WITH SPRING NUT

BACKGROUND OF THE INVENTION

1. Technical Field of the Invention

The invention relates to a pipe clamp.

Pipe clamps of this type are known.

2. Prior Art

EP 0 908 637 discloses a pipe clamp in which the tightening screw is fitted in a spring nut, which is supported on a flange at the second end of the clamp body, while the head of the tightening screw can grip behind lips of a flange on the first clamp end. The spring nut is made of spring steel and is substantially annular. On one side, the spring nut is divided and on each of the ends coming together there, one half of a screw thread collar is situated. The screw thread collar has several turns of internal screw thread through which the shank of the tightening screw can be pushed as the pressure of the tightening screw pushes the halves of the spring apart and the halves of the screw thread collar are forced apart. This known spring nut in practice requires a great pressure force in order to push the tightening screw through it.

EP 1 022 502 discloses a pipe clamp with a substantially identical spring nut, in which, however, each half of the screw thread collar is provided with an operating lip which extends outwards from the screw thread collar. This known spring nut is designed such that, when it is tightened, a finger is used to press on the tightening element while two other fingers simultaneously press on the operating lips, so that the halves of the screw thread collar are spread apart and the tightening element can pass the latter. This reduces the amount of pressure force required on the tightening screw.

OBJECTS AND SUMMARY OF THE INVENTION

It is an object of the invention to provide a pipe clamp with an alternative spring nut.

This object is achieved according to the invention by a pipe clamp according to the preamble of claim 1, characterized by the fact that the spring nut comprises a baseplate with a through-opening for the shank, as well as a set of resilient hinge parts and a set of connecting arms, in which the resilient lips of the first set are situated at a distance from the baseplate and each of which, on the end situated opposite the free end, is connected to an associated connecting arm which extends substantially transversely to the resilient lip, which connecting arm is in turn connected to the baseplate by means of an associated hinge part.

The spring nut is designed in such a manner that an axial displacement of the tightening element relative to the spring nut, where the distance between the head of the tightening element and the spring nut is reduced, can be achieved by hand. Loosening the tightening element is preferably only possible by unscrewing the tightening element. As a result of the application of the connecting arms extending transversely to the resilient lips, in the spring nut according to the invention the tightening element can be pushed through the spring nut with less force than with the known spring nuts.

Preferably, the spring nut according to the invention is made in one piece from spring steel, in particular from a sheet of spring steel.

Further preferred embodiments are defined in the dependent claims.

BRIEF DESCRIPTION OF THE DRAWINGS

The invention will be described in more detail in the description below with reference to the drawing, in which:

FIG. 1 shows a perspective view at an angle from below of a first preferred embodiment of a spring nut;

FIG. 2 shows a top view of the spring nut from FIG. 1;

FIG. 3 shows a side view of the spring nut from FIG. 1;

FIG. 4 shows a front view of the spring nut from FIG. 1;

FIG. 5 shows a bottom view of the spring nut from FIG. 1;

FIG. 6 shows a top view of the spring nut from FIG. 1 in an unfolded state;

FIG. 8 shows a perspective view at an angle from below of a second preferred embodiment of a spring nut;

FIG. 9 shows a bottom view of the spring nut from FIG. 8;

FIG. 10 shows a side view of the spring nut from FIG. 8;

FIG. 11 shows a front view of the spring nut from FIG. 8; and

FIG. 12 shows a top view of the spring nut from FIG. 8 in an unfolded state.

DETAILED DESCRIPTION OF THE PREFERRED EMBODIMENT(S) OF THE INVENTION

Figure 7A:
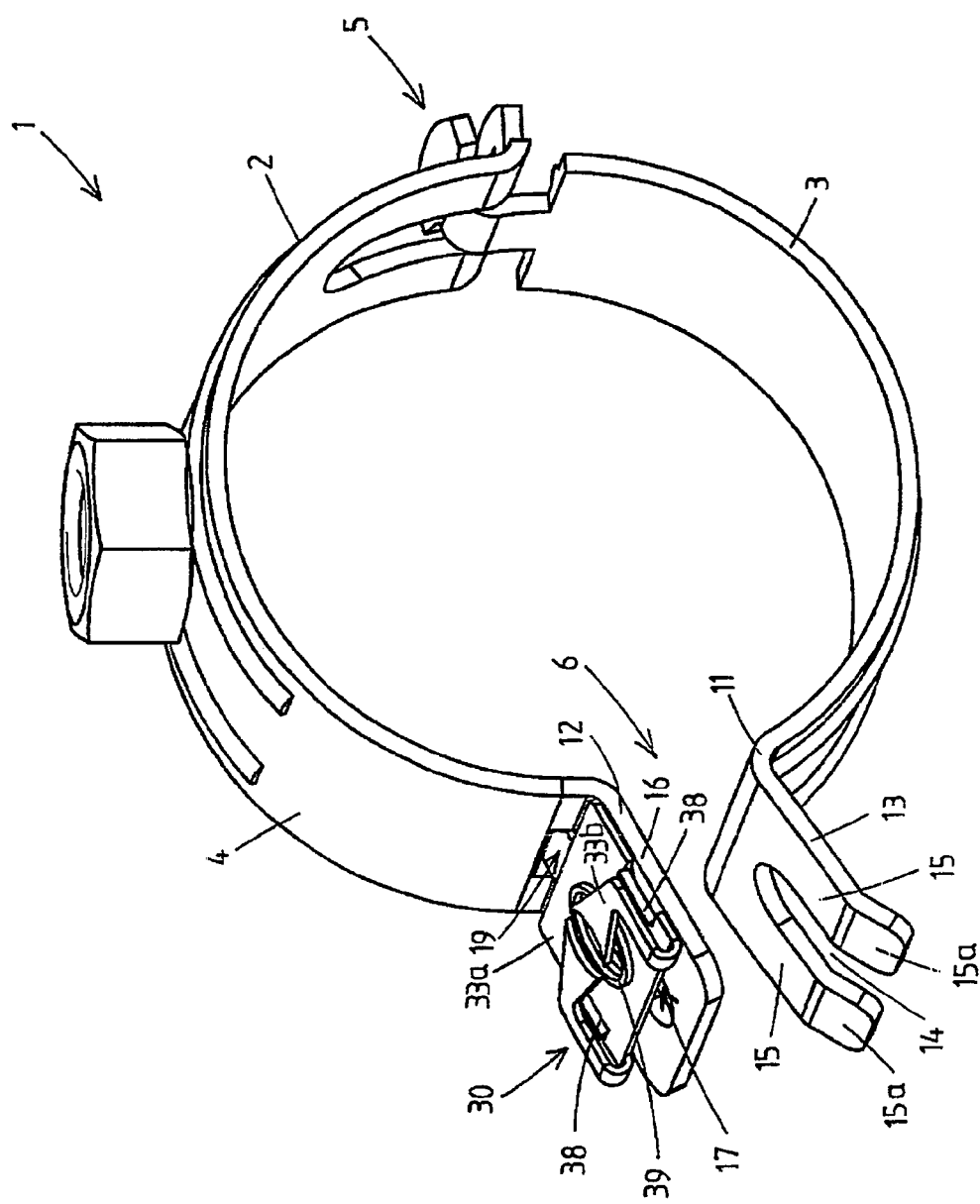
FIG. 7a shows a perspective view of a pipe clamp provided with the spring nut from FIG. 1.
Figure 7B:
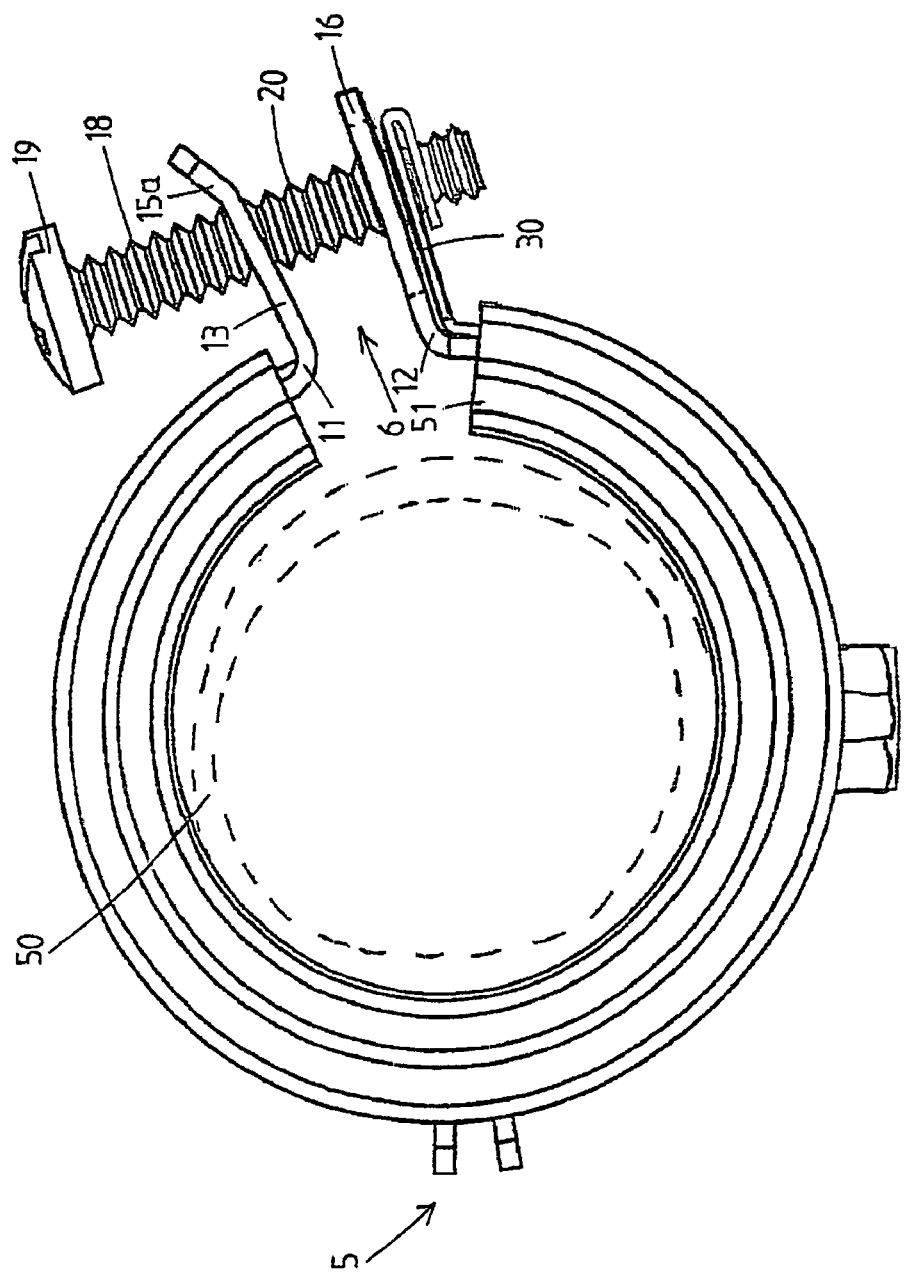
FIG. 7b shows a side view of the pipe clamp from FIG. 7a provided with an insert layer.

FIG. 7a shows a pipe clamp 1 with a clamp body 2 comprising two clamp halves 3 and 4, respectively, which are hingedly connected to one another by means of hinge means 5. The clamp body 2 has a first end 11 and a second end 12 which delimit an aperture 6 for arranging the pipe clamp 1 around a pipe 50 (see FIG. 7b). The aperture may be increased or reduced in size by pivoting the clamp halves 3 and 4 apart or towards one another. FIG. 7b shows how a vibration-absorbing insert 51 is disposed on the inside of the clamp body. This insert 51 is preferably made of an elastomer, for example rubber, or another elastic material and has a substantially C-shaped cross section. The insert 51 grips around the metal clamp body 2 together with the flanges of the C shape.

A first flange 13 is integrally formed on the first end 11, and a second flange 16 is integrally formed on the second end 12.

The first flange 13 has a slotted opening 14 which is open on the side of the flange which is remote from the clamp body 2. In this manner, two lips 15 are produced. In the exemplary embodiment shown, the free ends 15a of the lips 15 are slightly bent into a direction which is turned away from the second flange 16.

In the second flange 16, an elongate opening 17 is disposed which, in contrast with the opening 14 in the first flange 13, is enclosed on all sides by the second flange 16.

In order to close the pipe clamp 1 and to keep it closed, it comprises a tightening element, in particular a tightening screw 18, as is illustrated in FIG. 7b. The tightening screw 18 has a head 19 and a shank 20 which, in the example illustrated, is provided with external screw thread over its entire length. The shank could also be provided with a threaded profile or the like over part of its length. On the second flange 16, a spring nut 30, preferably made of spring steel, is arranged in order to cooperate with the tightening element 18 so as to keep the pipe clamp 1 closed.

The spring nut 30 has a baseplate 31 with a through-opening 32 for the shank 20 of the tightening screw 18. In the example illustrated, the baseplate 31 has a rectangular shape, but this may also be another shape. Two resilient lips 33a, 33b facing one another extend parallel to the baseplate 31. The resilient lips 33a, 33b are designed such that the edges of their free ends 34a, 34b engage on the shank 20 of the tightening element 18. The edges are sufficiently sharp for the edges to be accommodated in the space between the neighbouring tops of the screw thread of the tightening element 18 when the tightening element 18 is fitted in the spring nut 30. Said edges are preferably arcuate, as can be seen in FIG. 2.

Connecting arms 35a, 35b extend likewise parallel to the baseplate 31 from a set of resilient hinge parts 36a, 36b. The hinge parts 36a, 36b are connected to the baseplate 31. On the end remote from the associated hinge part 36a, 36b, each of the connecting arms 35a, 35b is connected to a resilient lip 33a, 33b, the resilient lip 33a, 33b extending substantially transversely preferably at right angles to the connecting arm 35a, 35b and in the direction of the centre axis of the through-opening 32.

On the side of the baseplate 31 opposite the hinge parts 36a, 36b, a pivot arm 37 is arranged, which is represented in the figures as an upwardly bent lip. The pivot arm 37 acts as securing element for securing the spring nut 30 to the clamp half 4 by inserting it into an aperture 19 provided near the second flange 16. Although this has not been illustrated here, the securing element may also be designed as a lip with parts projecting in the transverse direction, for example a T-shaped element, the transverse parts gripping behind the edges of the aperture in the clamp half 4. In the mounted state, the pivot arm 37 is situated between the clamp body 2 and the elastic insert 51, as a result of which the spring nut 30 can resiliently pivot relative to the second flange 16.

It is also possible to attach the spring nut to the clamp body 2 by means other than a pivot arm, for example by integrally forming lips on the edges of the baseplate which can be bent around the flange 16.

On the baseplate 31, on the side facing the resilient lips 33a, 33b, a stop member 38 is provided under each connecting arm 35a, 35b by bending a lip from the baseplate 31 in the direction of the connecting arm 35a, 35b. If the tightening element 18 is retracted from the spring nut 30 in the mounted state, the connecting parts 35a, 35b are detained by their associated stop member 38.

On the baseplate 31, on the side facing the resilient lips 33a, 33b, an annular projection 39 integrally formed with the baseplate 31 is arranged around the through-opening 32, which acts as stop member for the free ends 34a, 34b of the resilient lips 33a, 33b. If the tightening element 18 is retracted from the spring nut 30 in the mounted state, the free ends 34a, 34b of the resilient lips 33a, 33b are detained by the annular stop member 39. Instead of one annular stop member 39, several stop members may be provided which hold up the resilient lips 33a, 33b during a retracting of the tightening element 18.

The stop members 38 and 39 ensure that the free ends 34a, 34b of the resilient lips 33a, 33b cannot bend sufficiently far in the direction of the baseplate 31 for the shank 20 of the tightening element 18 to be able to pass between the free ends 34a, 34b, as is possible in the other direction.

The spring nut 30 illustrated is formed as a single part from spring-steel sheet by punching or cutting and bending. FIG. 6 shows a plate-shaped body 30' with a cut-out outer contour and openings before it is bent to form the spring nut 30 which is shown in FIGS. 1-5. In FIG. 6, the reference numerals referring to the abovementioned components of the spring nut 30 are provided with a prime. The hinge parts 36a, 36b are formed by bending the parts 35a', 35b' for forming the con-necting arms 35a, 35b back through 180° to above the baseplate 31, as a result of which the hinge parts 36a, 36b are formed as a bend of 180°. The pivot arm 37 is formed by bending the lip 37' through an angle, preferably an angle of approximately 60°, upwards. The stop members 38 are formed by cutting out a lip 38' on each side of the baseplate and bending said lip 38' from the baseplate 31 in the direction of the connecting arm 35a, 35b. The stop 39 is formed during punching of the through-opening 32' in the baseplate 31'.

FIGS. 8-11 show an alternative embodiment of a spring nut, which is made in one piece from a spring-steel sheet.

The spring nut 40 has a baseplate 41. A first set of resilient lips extends parallel to the baseplate 41, which first set comprises two resilient lips 43a, 43b facing one another. The resilient lips 43a, 43b are designed such that the edges of their free ends 44a, 44b engage on the shank 20 of the tightening element 18 and are situated in the space between the neighbouring tops of the screw thread of the tightening element 18 when the tightening element 18 is fitted in the spring nut 30. The resilient lips 43a, 43b are in each case connected to the baseplate 41 by means of a connecting arm 45a, 45b and a hinge part 46a, 46b in the same manner as the resilient lips 33a, 33b are connected to the baseplate 31 of the embodiment from FIGS. 1-5 illustrated above.

A second set of resilient lips is formed in the baseplate 41, which second set comprises two resilient lips 49a, 49b facing one another and extending in the plane of the baseplate 41. The free ends of the resilient lips 49a, 49b delimit the through-opening 42 for the shank of the tightening element. The resilient lips 49a, 49b of the second pair extend transversely and preferably at an angle of 90° relative to the resilient lips 43a, 43b, as can best be seen in FIG. 9. The first set of resilient lips and the second set of resilient lips each extend in planes running parallel to one another.

A stop member 48 is arranged under each resilient lip 43a, 43b on the baseplate 41, on the side facing the resilient lips 43a, 43b by bending a lip 48' (see FIG. 12) formed in the baseplate 31 in the direction of the resilient lip 43a, 43b. When the tightening element 18 is retracted from the spring nut 40 in the mounted state, the resilient lips 43a, 43b of the first set are detained by their associated stop member 38. As the baseplate 41 will come to bear against the second flange 16 of the pipe clamp 1 when the tightening element 18 is retracted, the resilient lips 49a, 49b of the second set are detained by the flange 16 and are unable to give way in order to allow the shank of the tightening element 18 to pass.

On the side of the baseplate 41 which is situated opposite the hinge parts 46a, 46b, a pivot arm 47 is arranged which is represented in the figures as an upwardly bent lip. This pivot arm 47 is formed in the same manner as the pivot arm 37 of the embodiment illustrated in FIGS. 1-5 and has the same function, namely that of securing element for securing the spring nut 40 to the clamp body. The pivot arm 47 could also be formed differently, for example be substantially T-shaped.

The spring nut 40 illustrated is made in one piece from a spring-steel sheet by means of punching or cutting and bending. FIG. 12 shows a plate-shaped body 40' with a cut-out outer contour and openings before it is bent to form the spring nut 40 which is shown in FIGS. 8-11. In FIG. 12, the reference numerals referring to the abovementioned components of the spring nut 40 are provided with a prime.

Incidentally, the spring nut 40, but likewise the spring nut 30, could also be made from a material other than spring steel, for example from stainless steel.

The illustrated embodiments of the spring nuts 30 and 40 are symmetrical relative to a central plane which extends at right angles to the direction of the first set of resilient lips 33*a*, 33*b*, 43*a*, 43*b*, but this is not imperative.

The invention claimed is:

1. A pipe clamp for attaching a pipe to a wall, ceiling or another base, comprising:

a clamp body having a first clamp halve and a second clamp halve, which are hingedly interconnected at one end by a hinge and each have at their other end an integral first flange and an integral second flange, respectively, wherein an aperture for arranging the pipe clamp around the pipe is delimited between the flanges, the first flange having two lips with a slotted opening between the two lips, which slotted opening is open at an outer end of the first flange, the second flange having an opening disposed therein, a tightening element which comprises a head and a shank, the shank extending through the opening in the second flange, the shank being receivable in the slotted opening of the first flange so as to engage the head behind the two lips, a spring nut which abuts against the side of the second flange facing away from the first flange and is spaced apart from the first flange, the shank of the tightening element being received in the spring nut, wherein the spring nut has a baseplate with a through-opening for the shank and a pivot arm extending from the baseplate through an aperture in the clamp body above the second flange, the pivot arm pivotally securing the spring nut to the clamp body, wherein the spring nut further comprises a pair of connecting arms that are integral with the baseplate that extend up from the baseplate at a side thereof remote from the pivot arm, said connecting arms each having a 180° bent portion so that a main portion of each of said connecting arms is spaced apart from the baseplate at the side thereof facing away from the second flange, the main portion of each connecting arm being integral with a resilient lip of a first set of resilient lips of the spring nut, said resilient lips each extending substantially transverse to the main portion of the connecting arm and each having a free end, the free ends of the resilient lips facing one another and the shank being received between said free ends.

2. Pipe clamp according to claim 1, in which the spring nut comprises stop members which are arranged on the baseplate and extend in the direction of the connecting arms, which stop members detain the connecting arms when the tightening element is retracted from the spring nut.

3. Pipe clamp according to claim 2, in which the stop members are integrally formed on the baseplate as a stop lip bent in the direction of the respective connecting arm.

4. Pipe clamp according to claim 1, in which the spring nut has at least one stop member which is arranged on the baseplate and extends in the direction of the resilient lip, which stop member detains the relevant resilient lip when the tightening element is retracted from the spring nut.

5. Pipe clamp according to claim 4, in which the stop member has an annular projection integrally formed on the baseplate and arranged around the through-opening in the baseplate.

6. Pipe clamp according to claim 4, in which the stop member has a bent stop lip which is integrally formed with the baseplate.

7. Pipe clamp according to claim 1, in which the baseplate is integrally formed with a second set of resilient lips, said resilient lips having free ends facing one another, the free ends of the second set of resilient lips forming the through-opening in the baseplate.

8. Pipe clamp according to claim 7, in which the resilient lips of the first set extend transversely to the resilient lips of the second set.

9. Pipe clamp according to claim 1, in which the clamp body internally covered with an insert made of elastic material, and in which the pivot arm rests against the insert in such a manner that the spring nut is attached to the clamp body so as to be able to pivot counter to the spring force of the insert.

* * * * *